United States Patent
Hintukainen

[19]

[11] Patent Number: 6,003,099
[45] Date of Patent: Dec. 14, 1999

[54] ARRANGEMENT AND METHOD RELATING TO HANDLING OF DIGITAL SIGNALS AND A PROCESSING ARRANGEMENT COMPRISING SUCH

[75] Inventor: Kari Anders Hintukainen, Norsborg, Sweden

[73] Assignee: Telefonaktiebolaget LM Ericsson, Stockholm, Sweden

[21] Appl. No.: 08/934,173

[22] Filed: Sep. 19, 1997

Related U.S. Application Data

[63] Continuation of application No. PCT/SE96/00332, Mar. 15, 1996.

[30] Foreign Application Priority Data

Mar. 22, 1995 [SE] Sweden ................................ 9501015

[51] Int. Cl.⁶ .................................................. G06F 12/02
[52] U.S. Cl. .................................. 710/52; 710/3; 710/53; 710/45
[58] Field of Search ...................... 341/50, 59; 395/569, 395/821, 250, 733, 845, 872; 364/230.2, 243, 200, 736.1; 345/511, 197; 365/189.05; 711/202; 710/45, 52, 53, 260, 1, 3; 712/228

[56] References Cited

U.S. PATENT DOCUMENTS

| | | | |
|---|---|---|---|
| 4,503,492 | 3/1985 | Pilat | 711/202 |
| 4,630,230 | 12/1986 | Sundet | 364/200 MS |
| 4,733,376 | 3/1988 | Ogawa | 365/221 |
| 4,800,524 | 1/1989 | Roesgen | 364/200 MS |
| 5,241,679 | 8/1993 | Nakagawa | 710/260 |
| 5,311,458 | 5/1994 | Haines et al. | 364/736 |
| 5,347,634 | 9/1994 | Herrell | 345/511 |
| 5,438,665 | 8/1995 | Taniai | 395/845 |
| 5,828,606 | 10/1998 | Mick | 365/189.1 |

FOREIGN PATENT DOCUMENTS

| | | |
|---|---|---|
| 3235243 | 7/1984 | Germany . |
| WO92/08186 | 5/1992 | WIPO . |

OTHER PUBLICATIONS

Kuch, David J. "The Structure of Computers and Computations", John Wiley & Sons Inc, pp. 247–249 (1978).

*Primary Examiner*—Thomas C. Lee
*Assistant Examiner*—Mohamed Mashaal
*Attorney, Agent, or Firm*—Burns, Doane, Swecker & Mathis, L.L.P.

[57] ABSTRACT

An arrangement and a method respectively for handling or getting access to a digital buffer in a digital buffer memory where to each digital buffer a set of pointers is arranged in a reference memory. The arrangement includes a register arrangement defining the position of a digital buffer in the digital buffer memory, an offset value, an address calculation arrangement and an operating address register. For each of the pointers in a set relating to a digital buffer, a separate pointer register is provided and address data is input and stored substantially at the same time in each pointer register corresponding to a set of pointers. The subsequent address for reading/writing in the digital buffer memory is calculated and stored in at least the operating address register.

20 Claims, 5 Drawing Sheets

FIG. 6 and Method Relating
to Handling of Digital Signals and
a Processing Arrangement
Comprising Such This application is a continuation of International Application No. PCT/SE96/00332, filed Mar. 15, 1996, which designated the United States.

BACKGROUND

The present invention relates to an arrangement and a method respectively for handling or administrating, particularly accessing, digital buffers arranged in a digital buffer memory. The invention also relates to a processing arrangement or a processor in which is arranged at least one digital buffer memory comprising a number of digital buffers.

Digital buffer memories or particularly so called job buffer memories are often comprised in for example digital processors. Such a job buffer memory often comprises a number of job buffers. A job buffer may take a number of different forms, for example it may be a circular buffer. Digital buffers are for example used for the purpose of more or less temporarily storing information which is to be transmitted from one unit/arrangement to another within e.g. a processor or during exchange of information between different processors etc.

However, the administration of job buffers may be complex and time consuming and for example it may require a great number of micro program steps. Mostly software solutions form the basis for the administration of the buffers. One known arrangement comprises a job buffer memory with a number of job buffers wherein each job buffer is a circular buffer (first In, first out buffer) which is used for storing signals. The signal may comprise several words of data and the size of the job buffer is not fixed each job buffer has a set of administrative pointers associated thereto which are arranged in a pointer register of a reference memory which is external to the buffer area. In this known arrangement it comprises four administrative pointers, a start pointer relating to the absolute physical address in the job buffer memory where the job buffer starts, an end pointer relating to the absolute physical address where the buffer ends, an in pointer relating to the absolute physical address in the job buffer memory where data should be written and finally an out pointer giving the absolute physical address in the job buffer memory where data is to be read. When an address is needed, it is output from the relevant pointer which then is increased or decreased by a given amount. If the buffer is a circular buffer, wrap around may occur if the increase or decrease is such that an in pointer gets lower than the out pointer.

When a signal is to be stored into a job buffer, it must be checked if there is space enough in the buffer for storing the signal. It must also be checked if a wrap around occurs. The signal is stored starting from the address pointed at by the in pointer. Thereafter the in pointer is updated in the pointer register, i.e. the reference memory.

When a signal is to be read from the buffer, the out pointer must be fetched from the reference memory and the signal from the job buffer memory pointed at by the out pointer is read. It has to be checked if wrap around occurs and finally the out pointer has to be updated in the reference memory. Thus the number of program steps which are required for storing and fetching of data in the job buffers is high.

WO 92/08186 shows a hardware implemented system for generating and accessing addresses in a job buffer. Particularly the invention disclosed therein describes an address generator for generating target addresses in a circular buffer which is defined by a base address and an end address. It comprises a register (I) for storing the previous address which was accessed within the buffer, register means for storing information defining the position and size of the circular buffer in the buffer memory, e.g. a base register and a length register or a base register and an end register. Furthermore the arrangement comprises a modify register in which is loaded the increment or decrement value relating to an offset. Further the arrangement comprises an adder through which an absolute address is generated by calculating the value of the previous stored address plus the off set and logic means for generating a wrapped address through modification of the above mentioned value by the length of the buffer. Moreover it comprises means for determining if the wrapped address is within the bounds of the circular buffer and finally means for loading the register in which the previous address accessed within the buffer is stored, either the absolute address or the wrapped address.

Thus the addresses are calculated before loading into the register. It is thus necessary to load the base register, the end register (or the length register) and the I register and particularly also the M register (offset) before reading or writing in the buffer memory. Thus four program steps are required which is a disadvantage. Furthermore, it is not possible to read and write at the same time with the known arrangement. To summarise, the arrangement, apart from the above mentioned, is not sufficiently fast, particularly not if there are many job buffers in the buffer memory.

SUMMARY

Since it is of importance to save time in handling/administrating digital buffers in a buffer memory an arrangement and a method respectively is needed through which less time is required for administrating and handling a digital buffer In a buffer memory. An arrangement is also needed through which the generation of addresses for access to digital buffers is done in an efficient and fast way. An arrangement is also needed through which the addressing logic can be handled in an efficient and fast way.

Furthermore a processing arrangement or a processor which comprises one or more buffer memories is needed wherein the handling/administration of the digital buffers is improved in that it is made more efficient and faster and thus providing a processor having a high capacity.

Therefore an arrangement for handling or administrating digital buffers arranged in a digital buffer memory is provided. For each buffer a set of pointers is arranged in a reference memory. The arrangement comprises a register arrangement through which the position of a digital buffer in a buffer memory is defined, a given offset value, an address calculation arrangement and an operating address register. For each pointer in a set of pointers is provided a separate pointer register and address data can be input and stored substantially simultaneously in each painter register and the subsequent address is calculated in the calculating arrangement and stored in the operating address register.

The offset value is used if the word that is to be written or read is not placed immediately after the previous word. Particularly the offset may be negative or positive. Particularly the operating register is automatically updated so that it points at the next word which is to be read from or written into the buffer memory also when the data storage space, i.e. the space in the digital buffer, wraps around. The set of pointers may comprise a start pointer, an out pointer, an in pointer and an end pointer. The start pointer and the end pointer particularly define the position of the digital buffer. To each of the pointers a separate register is arranged as referred to above, and the in pointer is updated in write mode and the out pointer in read mode with the same data as the operating address in the operating register which is the address when reading and/or writing in the buffer memory.

This facilitates updating of the pointers in the reference memory after reading from and/or writing a signal into the buffer memory which thus is done. The order of the input and output pointers in different depending on whether wrap around has occurred or not. Particularly the register arrangement comprises a job buffer start address register and a job buffer end address register.

Through the invention is further provided a processing arrangement in which communication generating signals communicates with a signal processor handling and sorting the signals in digital buffers in a digital buffer memory wherein actions are initiated upon communicating of a signal to an instruction processor in communication with the signal processor. In the signal processor an arrangement is provided which comprises a separate pointer register for each pointer in a set of pointers arranged in a reference memory. Address data relating to signals to read/write in the digital buffer memory is input and stored substantially simultaneously in each pointer register. The arrangement further comprises an operating address register and when the address to read/write is calculated, it is stored in the operating address register.

In a particular embodiment the processing arrangement comprises a central processor in a telecommunications system.

It is an advantage with the invention that the administration or the handling (accessing) of the digital buffers in a buffer memory is facilitated and fast. Another advantage is that the number of program steps required for accessing a job buffer is considerably reduced in relation to known arrangements.

A further advantage is that a processor is provided which has a high capacity.

BRIEF DESCRIPTION OF THE DRAWINGS

The invention will in the following be further described in a non-limiting way under reference to the accompanying drawings in which.

DETAILED DESCRIPTION

Figure 1:
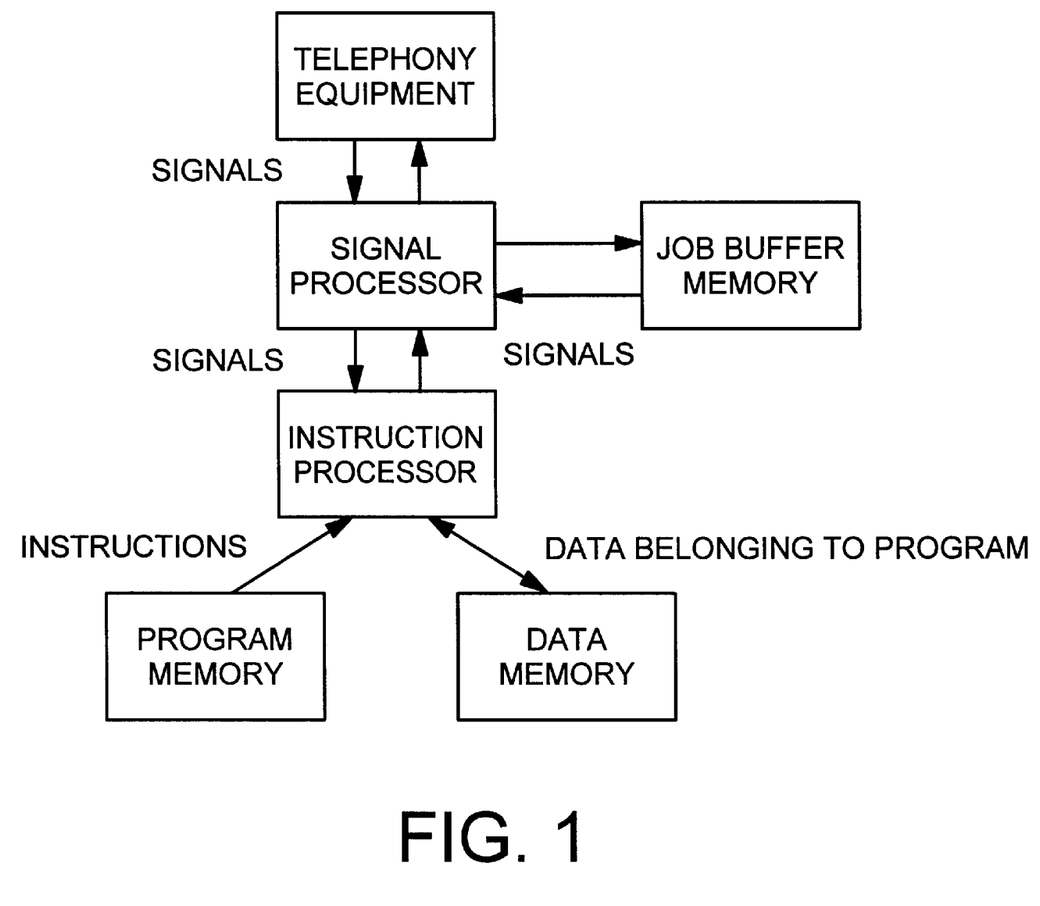
FIG. 1 schematically Illustrates a processing arrangement.

FIG. 1 schematically illustrates a processing arrangement, for example a central processor in a telecommunications system. The signal processor has to take care of a lot of signals which are generated by the telephony equipment (in the present embodiment) which signals are transmitted to and from the signal processor SPU. The signal processor then sorts the incoming signals e.g. according to a priority scheme. This can be done by sorting them in different signal queues or buffers in the job buffer memory. The job buffer memory may comprise a number of job buffers which is more clearly illustrated in FIG. 4. When a certain action has to be taken by the central processor, this initiated by the sending of a signal to the instruction processor. The signal then starts up a program in the program memory. This program eventually sends out signals starting other programs in the instruction processor or going out of the processor in order to control some equipment in the telephony part. These signals which are generated by the instruction processor are furthermore also taken care of by the signal processor wherein they are sorted according to a priority scheme with the signals that are already waiting in the job buffers of the job buffer memory. The priority is given by into which job buffer the signal is sorted. (The priority within a particular job buffer is always first-in-first-out.) It is of the utmost importance that the signal processor can handle all signals as fast as possible since the capacity of the instruction processor depends thereon and if the capacity of the instruction processor is too low, this may form a bottleneck of the central processor.

Figure 2:
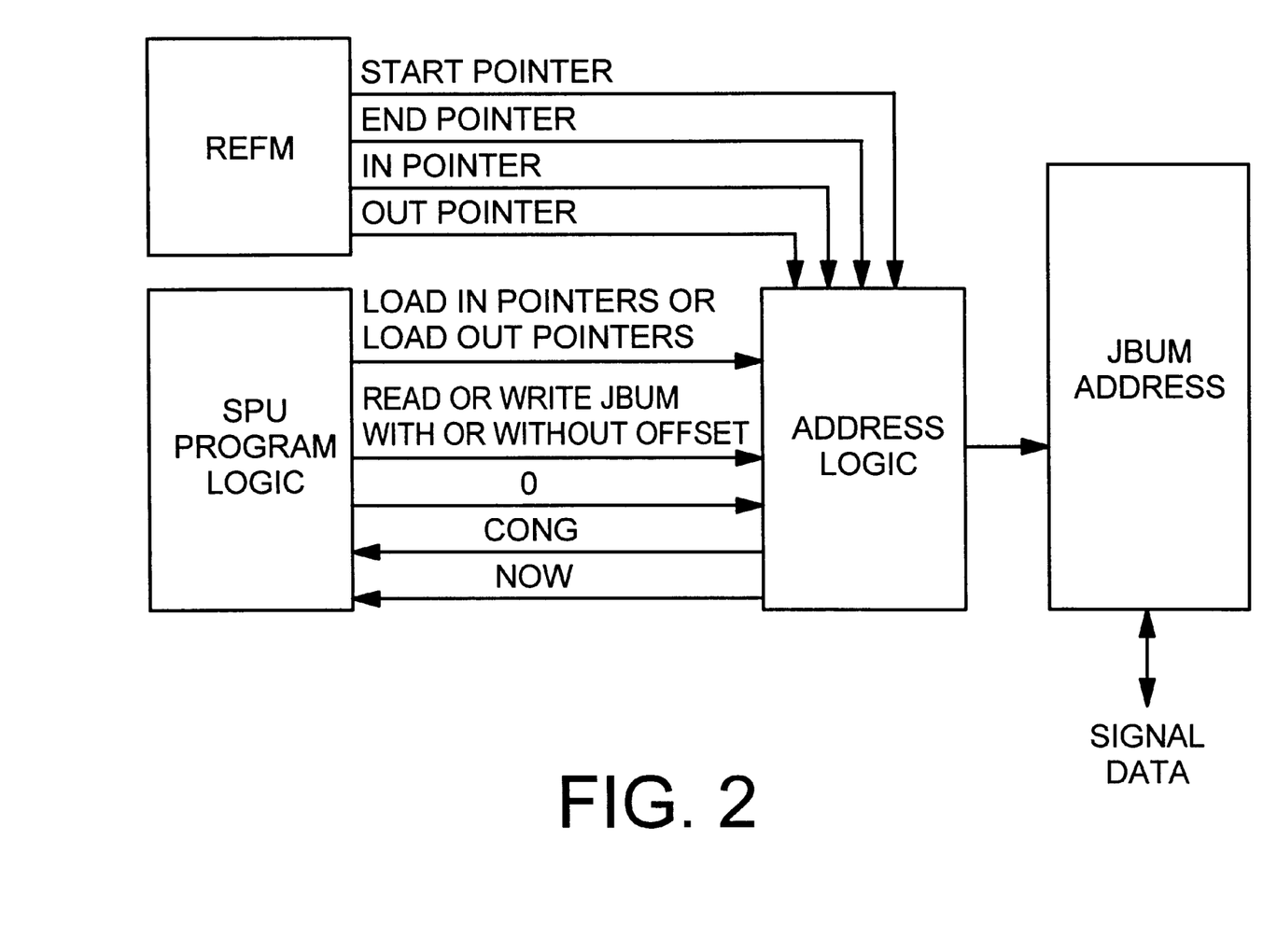
FIG. 2 schematically illustrates a signal processor comprising an arrangement for handling digital buffers.

FIG. 2 schematically illustrates how the arrangement for handling the digital buffers is arranged in relation to the signal processor SPU. The signal processor SPU comprises the reference memory REPM, the program logic and the address logic. The functioning is more thoroughly described under reference to FIGS. 3–6 and it Is also applicable to this Figure.

Figure 3:
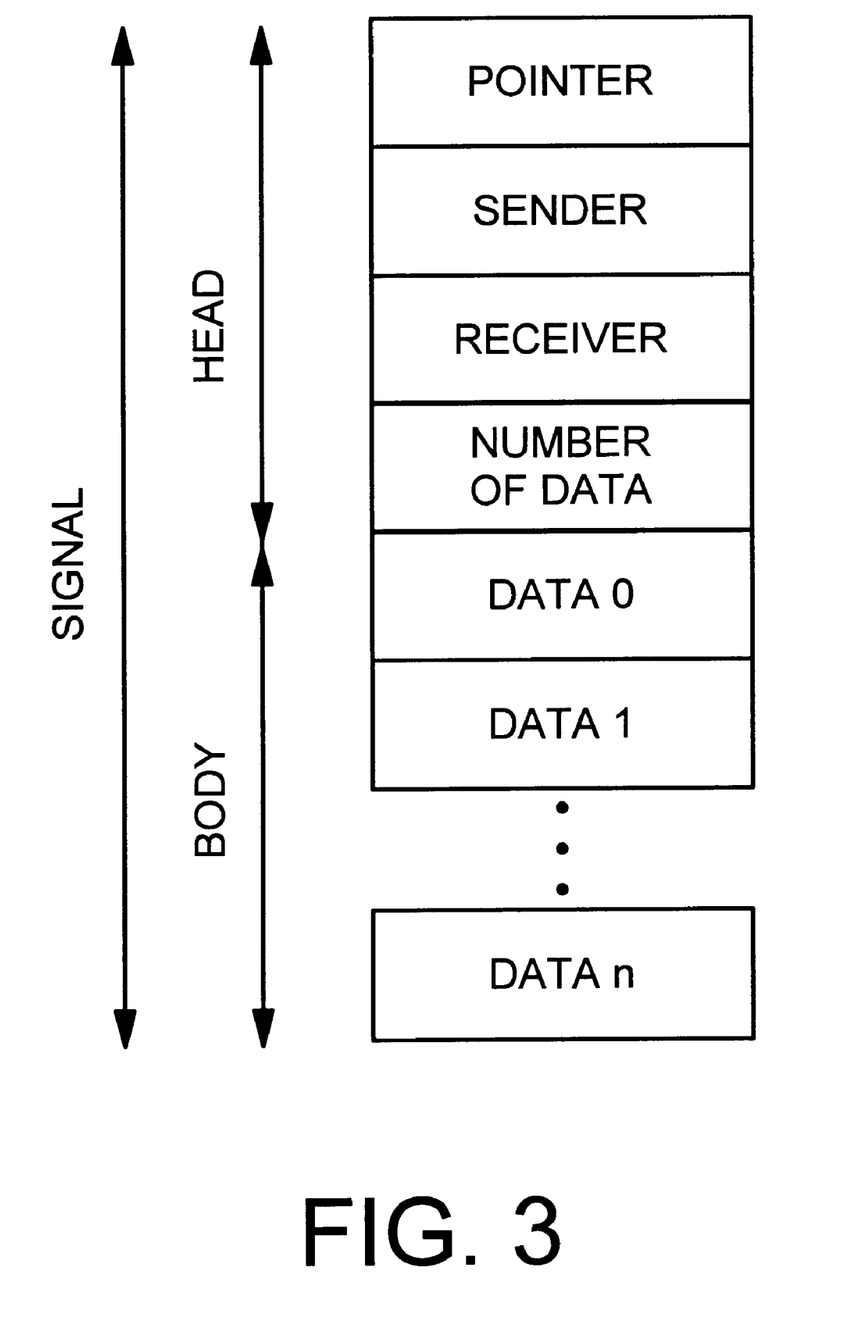
FIG. 3 illustrates a signal.

FIG. 3 schematically illustrates a signal merely for explanatory reasons. A signal is typically a packet of data arranged in the form of a header with accompanying data. It can for example take the forms illustrated in FIG. 3. The signal is divided into a head part and to a body part. The head part or the header comprises a pointer which gives the type of the signal which in turn to determines its priority. The sender indicates what program or equipment that has generated the particular signal and the receiver indicates what program or equipment that should receive the particular signal. The number of data indicate the size of the body and finally the body part comprises the data, data 0, data 1, . . . , data n.

Figure 4:
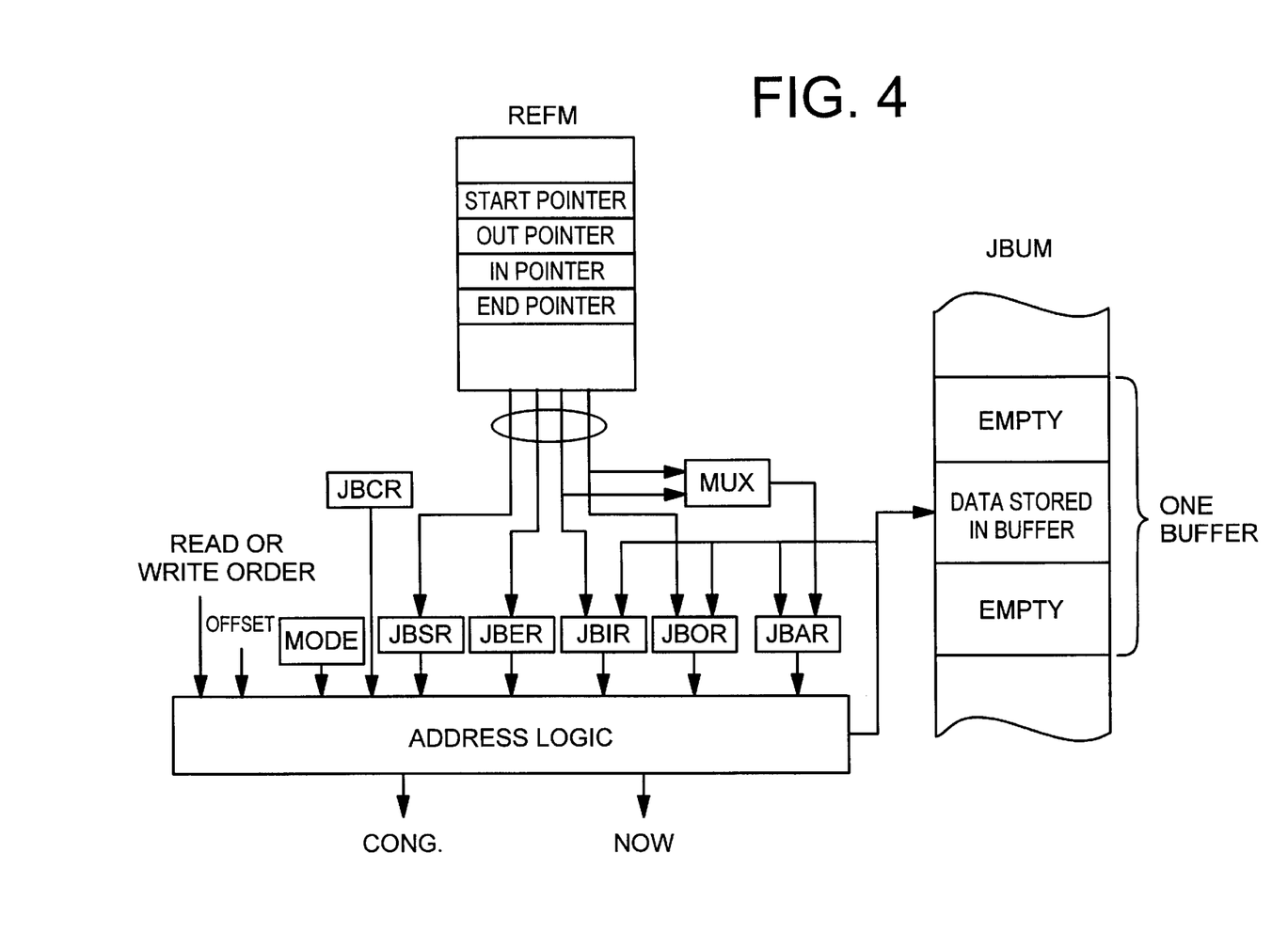
FIG. 4 illustrates one embodiment of an arrangement handling/administrating a job buffer.
Figure 5:
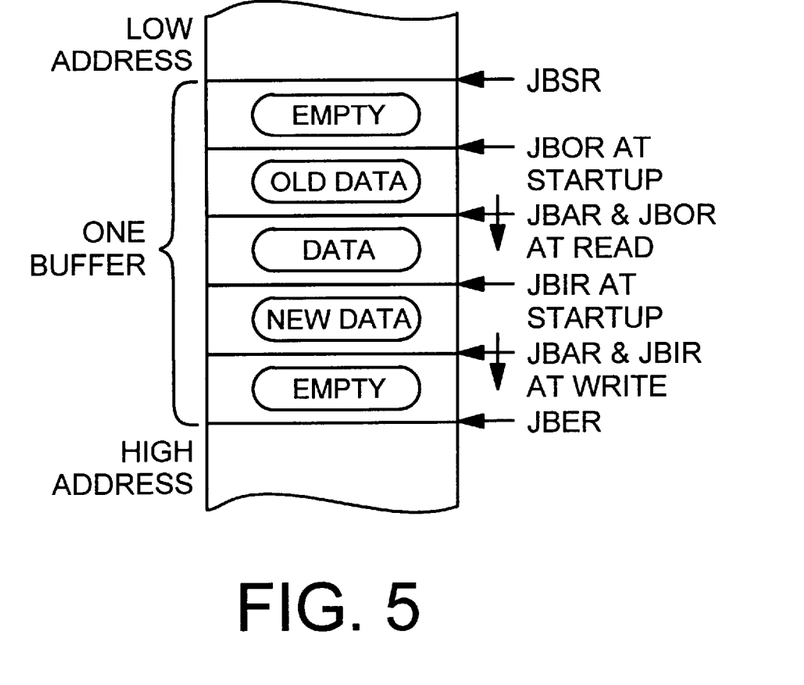
FIG. 5 illustrates writing/reading in a job buffer and FIG. 6 illustrates writing/reading in a job buffer when wrap around has occurred.
Figure 6:
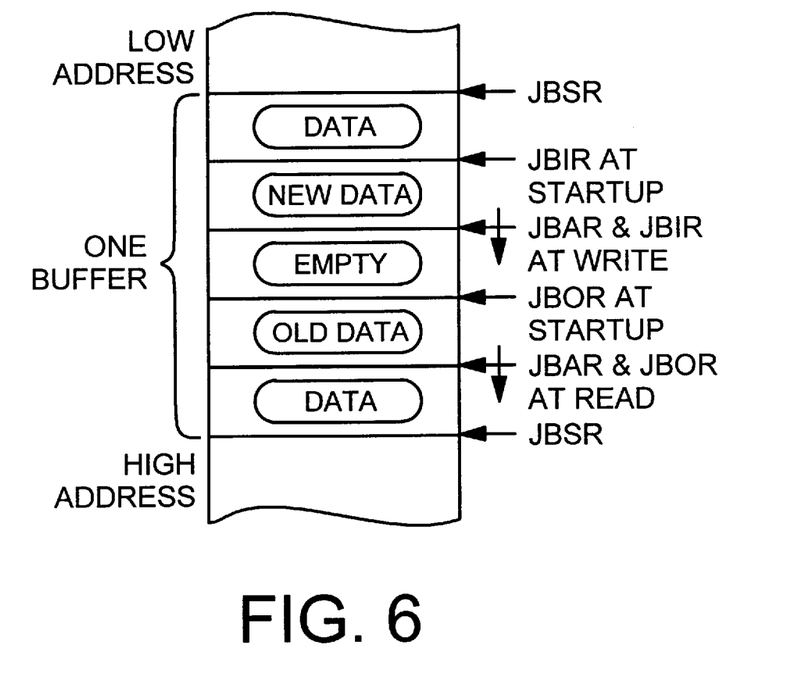

In one particular embodiment there are at least eight types of signals requiring eight different job buffers in the job buffer memory. The job buffers are administrated by a set of pointers which are stored in a job buffer reference memory (REFM). With reference to FIGS. 4–6 an arrangement according to the invention for handling or administration of the digital buffers or the job buffers will be more thoroughly described.

In a particular embodiment, as referred to in the foregoing, a digital buffer memory forms a so called job buffer memory JBUM which is used to store a number of digital buffers, which in the described embodiment comprise job buffers. A job buffer is here a circular (first in, first out) buffer and it is used for storing signals, particularly for temporary storing of the e.g. signals in a telecommunications system, such as e.g. A the AXE-system by Ericsson. A signal as referred to above comprises a number of words of data. Moreover the size of a job buffer is not fixed.

In FIG. 4 a job buffer memory JBUM is illustrated and the job buffer in the buffer memory is particularly indicated. To each job buffer a set of pointers is provided. The sets of pointers are stored in a reference memory REFM. One set of pointers for one buffer in the job buffer memory JBUM comprises a start pointer, an out pointer, an in pointer and and pointer.

The arrangement for handling or administrating one or more job buffers in a job buffer memory will now be explained. For each pointer in a set of pointers as referred to above, a separate pointer register is arranged. For the start pointer (JBSR pointer) a Job buffer start address register JBSR is arranged and to the end pointer a job buffer end address register JBER is arranged (the pointer is likewise referred to as the JBER pointer). The job buffer end address relates to the highest address In the job buffer and the job buffer start address for relates to the lowest numbered address in the Job buffer. For the in pointer JBIR in pointer a job buffer in pointer register JBIR is arranged. The in pointer JBIR indicates where to write data. Finally to the out pointer a job buffer out pointer register JBOR is arranged. The out pointer JBOR indicates where to read data.

FIG. 4 illustrates simultaneous transport of the four pointers in a set to the respective registers JBSR, JBER, JBIR and JBOR. This is indicated by A. This means that the pointer registers are loaded substantially at the same time. The in pointer and the out pointer are multiplexed in a multiplexing arrangement MUX and transported to the operating register JBAR which relates to the operating address which is to be used when reading/writing in the job buffer. Thus, according the invention, only one program step is needed for the transmission of all pointers of a set directly into their respective registers. After this step it can be read/written in the job buffer. The address for reading/writing is substantially instantly calculated in the address logic after the loading of the registers. Thus all the addresses are calculated after data has been transmitted to the registers, after reading/writing a signal into a Job buffer of the job buffer memory, the pointers in the reference memory REFM are updated. The calculations in the address logic in relation to the embodiment described herein will now be further described.

The operating register JBAR is automatically updated so that it points at the next word to read/write whether or not the data storage space wraps around. This will be more fully explained below.

The job buffer in pointer register JBIR (in write mode) and the job buffer out pointer register JBOR (in read mode) are updated with the same date as is the operating register JBAR. Then the in/out-pointers in the reference-memory REFM are updated after reading/writing a signal into a job buffer of the job buffer memory JBUM. An offset input 0 is used when the word to be written/read is not placed immediately after the previous word. When the offset 0 is used, a wrap around may occur. The offsee may be either negative $0^-$ or positive $0^+$ when carrying out the above mentioned functions as well as two further functions relating to congestion and remaining space in a buffer which will be further discussed below. Attention has to be paid as to whether a wrap around has occurred or not, i.e. that the input and output pointers are in different order depending on whether a wrap around has occurred or not.

This is illustrated in FIGS. 5 and 6. What distinguishes FIGS. 5 and 6 from each other is that the out pointer JBOR and the In pointer JBIR are in different order. FIG. 5 shows e.g. a first case wherein data is written into the Job buffer. Where this is done is indicated by the arrow denoted JBAR and JEMR at write.

When continuing to write in data, this pointer will move downwards until it reaches JBER which denotes end of buffer. If further writing in the buffer is needed, this has to be continued at JBSR since the buffer is circular. This is denoted a wrap around. If writing thus is continued case two as described in FIG. 6 is relevant. This gives that the in pointer JBIR is located before the out pointer JBOR.

If instead reading is done from the buffer and a wrap around has occurred, i e. relating to case 2 as described in FIG. 6, then the out pointer JBOR indicates where to start reading. For every word that is read, JBOR is increased by one and it points at the next word to read and finally is arrived at JBER. Then the pointer at reading wraps around thus returning to case one of FIG. 5. Then JBOR is lower than JBIR.

Empty in the figure indicates that there is no data. Upon starting to write it is the JBIR pointer that indicates from where it is possible to start and fill in data and JBIR at start up indicates the value from where to start writing a signal, i.e. the starting value. This is denoted new data and thus shows where the signal should be introduced. Old data relates to already written data, i.e. occupied space. Correspondingly JBOR at start up indicates where to start reading data and JBAR and JBOR at read indicates where data is being read in an analogous manner.

In an advantageous embodiment information may be supplied to the program logic, of FIG. 2 that the job buffer is congested. In a congestion register JBCR is indicated how many words the empty area at least should comprise. Congestion thus relates to a signal which tells that there is too little space left in the empty area. The criterium for congestion is thus that the number of words in the empty area is lower than the number of words as pointed out in the job buffer congestion register JBCR. This can be set in any desired manner.

A further function that the arrangement according to the invention advantageously may comprise relates to supply of information to the program logic about the number of data words in the buffer which have not been read, the number of word NOW. This relates to a data output indicating the number of words that are written in the buffer but which have not yet been read. This means that it denotes the number of occupied positions in the job buffer.

Via the implementation of the mode function, (Mode, FIG. 4) which may be a read/write gate, is initiated that the in pointer JBIR and the operating register JBAR are both continuously updated during reading. If the mode function is in position write, the out pointer JBOR like the operating register JBAR is continuously updated during writing.

The calculations of a physical address (zradr) in the job buffer memory JBUM which is to be read or written will here further be explained. It is however a pre-condition for the described calculations to function that the JBSR pointer is smaller than the JBER pointer.

First a case is described wherein a positive offset $0^-$ is used. If the address operating pointer JBAR plus the offset $0^+$ is higher than the JBE pointer address, then the physical address in the job buffer memory is equal to the job buffer start address JBSR plus the job buffer operating address JBAR plus the offset $0^+$ minus the job buffer end address JBM.

If however the sum of the operating address JAR and the offset $0^+$ is smaller than or equal to the job buffer end address JBER, the physical address is equal to the sum of the operating address JBAR and the offset $0^+$. In form of formulas, this reads as follows:

if (JBAR+offset>JBER) then radr=JBSR+JEAR+offset−JBER else radr=JBAR+offset

If however a negative offset is used $0^-$, and if the difference between the operating address JBAR and the offset $0^-$ is smaller than the job buffer start address JBSR, then the physical address in the job buffer memory is equal to the job buffer end address JBER minus the offset 0⁻ reduced by the operating address JBAR and the job buffer start address JBSR. If however the difference between the operating address JAPAR and the offset 0⁻ exceeds or is equal to the job buffer start address JBSR, the physical address is the operating address JBAR reduced by the offset 0⁻. This can be expressed as a formula in the following way:

If (JBAR–offeet<JBSR) then radr=JBER–(offset–JBAR–JBSR) else radr=JEAR–offset

The calculations of the next address to read or write are as follows:
If the operating address JBAR is equal to the job buffer end address JSER, then the next operating address is the job buffer start address JBSR. If the operating address JBAR is not equal to the job buffer end address JBER, the next operating address JBAR is equal to JBAR increased by one. This can be expressed as follows:

if (JBAR=JBER) then nextJBAR=JESR else nextJBAR=JBAR+1

The congestion calculation formulas can correspondingly take the following form:

if (JBIR>=JBOR) then CONG=(JBER–JBSR)–(JBIR–JBOR)<JBCR else CONG–(JBOR–JBIR)<JBCR The calculation formulas for the number of stored words NOW i.e. the number of words that have not been read accordingly take the following form:

if (JBIR>=JBOR) then NOW=JBIR–JBOR else Now=(JBIR–JBSR)+(JBER–JBOR)+1

It is an advantage of the invention that the number of steps required for storing and fetching data in the job buffers is significantly reduced. This is particularly of importance if there are many job buffers in a job buffer memory, for example there may be round twenty job buffers in a memory. This figure is of course merely given as an example and it is by no means limiting. Even if there are merely a few buffers in the buffer memory efficiency and complexity is considerable reduced through the present invention as well as if there are more, up to twenty or more job buffers in the job buffer memory.

The arrangement according to the invention can e.g. be construed using a synthesizer but it can also be built using standard components etc.

What is claimed is:

1. Arrangement for handling a digital buffer, particularly a circular buffer, arranged in a digital buffer memory wherein to each digital buffer in the digital buffer memory a set of pointers is arranged in a reference memory, comprising a register arrangement defining the position of a digital buffer in the digital buffer memory, a given offset value, an address calculation arrangement and an operating address register, wherein for each pointer in a set, a separate pointer register is provided and address data is input and stored substantially simultaneously in each pointer register corresponding to one set of pointers, a subsequent address for reading/writing is calculated and stored in at least the operating address register, and a multiplexing arrangement is provided to substantially multiplex pointers and transport said multiplexed pointers to said operating register, relating to the operating address to be used when reading/writing the digital buffer memory and thus in only one program step to transfer the pointers of a set into their respective registers.

2. Arrangement according to claim 1, wherein to the subsequent address an offset is added if the subsequent address is not placed immediately after the previous address.

3. Arrangement according to claim 1, wherein a set of pointers comprises a start pointer, an out pointer, an in pointer and an end pointer.

4. Arrangement according to claim 1, wherein the register arrangement comprises a job buffer start address register, a job buffer end address register, an in pointer register for the address for writing data and an out pointer register for the address for reading data.

5. Arrangement according to claim 4, wherein the in pointer register is updated with the same data as is the operating register.

6. Arrangement according to claim 4, wherein the out pointer register is updated with the same data as the operating register.

7. Arrangement according to claim 1, wherein a positive offset is used.

8. Arrangement according to claim 7, wherein if the sum of the address contained in the operating register and the positive offset exceeds the job buffer end address, the physical address for reading/writing is the sum of the job buffer start address, the address in operating register and the offset less the job buffer end address.

9. Arrangement according to claim 7, wherein if the sum of the address contained in the operating register and the offset does not exceed the job buffer end register, the physical address for reading/writing is the sum of the address contained in the operating register and the offset.

10. Arrangement according to claim 1, wherein the offset is negative.

11. Arrangement according to claim 10, wherein if the address contained in the operating register reduced by the offset is lower than the job buffer start address, the physical address for reading/writing is the job buffer end address reduced by the offset, and the sum of the address contained in the operating register and the job buffer start address.

12. Arrangement according to claim 10, wherein if the address contained in the operating register reduced by the offset at least is equal to the job buffer start address, the physical address for reading/writing is the address contained in the operating register reduced by the offset.

13. Arrangement according to claim 1, wherein if the address contained in the operating address register is the same as the job buffer end address, the subsequent, operating, address to read/write is the job buffer start address, otherwise it is the operating address increased by one.

14. Arrangement according to claim 1, further comprising a congestion detecting arrangement.

15. Arrangement according to claim 14, wherein the congestion detecting arrangement comprises a register indicating a given lowest number of words that can still be written in the job buffer.

16. Arrangement according to claim 1, further comprising means for calculating and indicating the number of words in a job buffer which are written but not read.

17. Processing arrangement comprising a signal processor handling signals communicated to it by internal and/or external equipment, an instruction processor receiving instructions from a program memory and a job buffer memory comprising a number of job buffers, wherein the signal processor comprises separate pointer registers for each pointer in a set of pointers belonging to a job buffer, the pointers being arranged in a reference memory, in the signal processor the signals from the equipment and from the instruction processor are sorted according to a given priority scheme in the job buffer memory, and address data relating to a signal to write/read in the job buffer is transmitted substantially simultaneously to each pointer register, wherein further an address calculating arrangement and an operating address register are provided, a subsequent address for reading/writing being calculated and stored at least in the operating address register, and a multiplexing arrangement is provided to substantially multiplex pointers and transport said multiplexed pointers to an operating register, relating to the operating address to be used when reading/writing the job buffer memory and thus in only one program step transferring the pointers in the set of pointers to their respective registers.

18. Processing arrangement according to claim 17, further comprising a central processor in a telecommunications system.

19. Processing arrangement according to claim 17, wherein the subsequent address is stored in a job buffer out pointer register or an in pointer register for reading or writing respectively.

20. Method for accessing a digital buffer in a digital buffer memory wherein to each digital buffer a set of pointers is arranged in a reference memory comprising the steps of:

defining the position of a digital buffer in a job buffer memory in a pointer register arrangement, transmitting the pointers defining the position of the digital buffer to the register arrangement provided therefor, transmitting an in pointer indicating where in the digital buffer to write data and an out pointer indicating where in the digital buffer to read data to each a register arranged therefor substantially simultaneously with the transmission of the position defining pointers, only one program step being required for transferring the pointers in a set of pointers to their respective pointer registers, calculating the operating address to be used when reading/writing in the digital buffer, and automatically updating an operating address register arranged for the operating address so that it points at a subsequent word to read/write, updating the in pointer register or the out pointer register depending on whether a signal is to be written or read in agreement with the updating of the operating address, arranging multiplexing means to substantially multiplex pointers and transport said multiplexed pointers to the operating register, relating to the operating address to be used when reading/writing the job buffer memory, thus in only one program step transferring the pointers in the set of pointers to their respective registers, and updating the in pointer at write or the out pointer at read of the set of pointers in the reference memory.

* * * * *